(12) United States Patent
Alberty et al.

(10) Patent No.: US 6,255,986 B1
(45) Date of Patent: Jul. 3, 2001

(54) CALIBRATION METHOD AND ARRANGEMENT

(75) Inventors: Thomas Alberty; Waldemar Hauk; Volker Hespelt; Franz-Josef Hagmanns, all of Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/297,299
(22) PCT Filed: Oct. 27, 1997
(86) PCT No.: PCT/DE97/02480
§ 371 Date: Jun. 18, 1999
§ 102(e) Date: Jun. 18, 1999
(87) PCT Pub. No.: WO98/19360
PCT Pub. Date: May 7, 1998

(30) Foreign Application Priority Data

Oct. 28, 1996 (DE) ................................. 196 44 686

(51) Int. Cl.[7] ............................................. G01S 7/40
(52) U.S. Cl. .................. 342/174; 342/165; 342/173; 342/195; 342/196; 342/368
(58) Field of Search .................... 342/165–174, 342/368–377, 192–197, 82, 89; 370/203, 319

(56) References Cited

U.S. PATENT DOCUMENTS

| | | |
|---|---|---|
| 5,027,127 | 6/1991 | Shnitkin et al. . |
| 5,223,842 | 6/1993 | Okurowski et al. . |
| 5,412,414 | 5/1995 | Ast et al. . |
| 5,555,257 * | 9/1996 | Dent ...................................... 370/319 |
| 5,631,898 * | 5/1997 | Dent ...................................... 370/203 |

FOREIGN PATENT DOCUMENTS

| | | |
|---|---|---|
| 41 07 803 | 9/1992 | (DE) . |
| 44 21 573 | 1/1996 | (DE) . |
| 2 735 937 | 12/1996 | (FR) . |

* cited by examiner

*Primary Examiner*—Bernarr E. Gregory
(74) *Attorney, Agent, or Firm*—Kenyon & Kenyon (57) ABSTRACT

To calibrate a transmitter and/or sender for controlling a beam forming network, each of the control signals is divided into a plurality of frequency segments. The control signal of each frequency segment is multiplied by complex coefficients so that the transmitter output signals, after passing through a reference receiver, are identical to the respective control signals. A similar adjustment is performed for the receive direction. The method and the device allow the same beam characteristic.

8 Claims, 6 Drawing Sheets

Desirable:

$$A_S(\phi) = c\, A_E(\phi)$$
$$c \neq f(n)$$

same antenna pattern shape for $$a_n = b_n$$

adjustment coefficient in BF for transmission/reception is identical

Implementation with calibration $$\overline{A}_S(\phi) = \sum_{n=0}^{N-1} b_n \cdot \sigma_{m,n} \gamma_{s,m} \cdot e^{-j2\pi n \frac{d}{\lambda}\sin\phi}$$

$$= \frac{1}{\rho_{ref,m}} \sum_{n=0}^{N-1} b_n \cdot \frac{\sigma_n}{\rho_n} \cdot e^{-j2\pi n \frac{d}{\lambda}\sin\phi}$$

$$\overline{A}_E(\phi) = \sum_{n=0}^{N-1} a_n \cdot \rho_{m,n} \gamma_{E,m} \cdot e^{-j2\pi n \frac{d}{\lambda}\sin\phi}$$

$$= \frac{1}{\sigma_{ref,m}} \sum_{n=0}^{N-1} a_n \cdot \frac{\sigma_n}{\rho_n} \cdot e^{-j2\pi n \frac{d}{\lambda}\sin\phi}$$

After calibration and with $$a_n = b_n$$

the following applies $$\overline{A}_S(\phi) = c\, \overline{A}_E(\phi)$$
$$c \neq f(n)$$

Fig. 7

CALIBRATION METHOD AND ARRANGEMENT

FIELD OF THE INVENTION

The present invention relates to a calibration device and a method for calibrating a transmitter and/or a receiver to activate a beam forming network.

BACKGROUND INFORMATION

In SDMA (Space Division Multiple Access) wireless transmission systems, the antenna characteristic can be set on the receiver side, using conventional beam forming networks having appropriate adaptation algorithms, so that the useful signal experiences a high antenna gain, while interference signals are strongly suppressed.

German Patent Application No. 41 07 803 A1 describes an arrangement whereby the fixed station is equipped with an antenna array. Depending on the phase modulation, the shape of the beam lobe can be adapted to the objects to be detected. In German Patent Application No. 44 21 573 A1, which describes a receiver arrangement for moving objects, the received signals are weighted and combined into a plurality of signal paths by antenna elements so that each one is assigned by them to a different signal incidence direction of the antenna.

SUMMARY OF THE INVENTION

The present invention provides that the beam characteristic intended for the receiver can also be set for the transmitter. To calibrate the transmitter and the receiver, a calibration network is provided, for which easily implementable adjustment criteria are observed. An advantage of the method according to the present invention is that no high-precision transmitter or receiver is needed. Deviations in the transmission functions of the transmission links to the antenna array have no detrimental effect.

BRIEF DESCRIPTION OF THE DRAWINGS

Embodiments of the invention and the principles of beam forming networks are elucidated with reference to the drawings.

DETAILED DESCRIPTION

Figure 1:
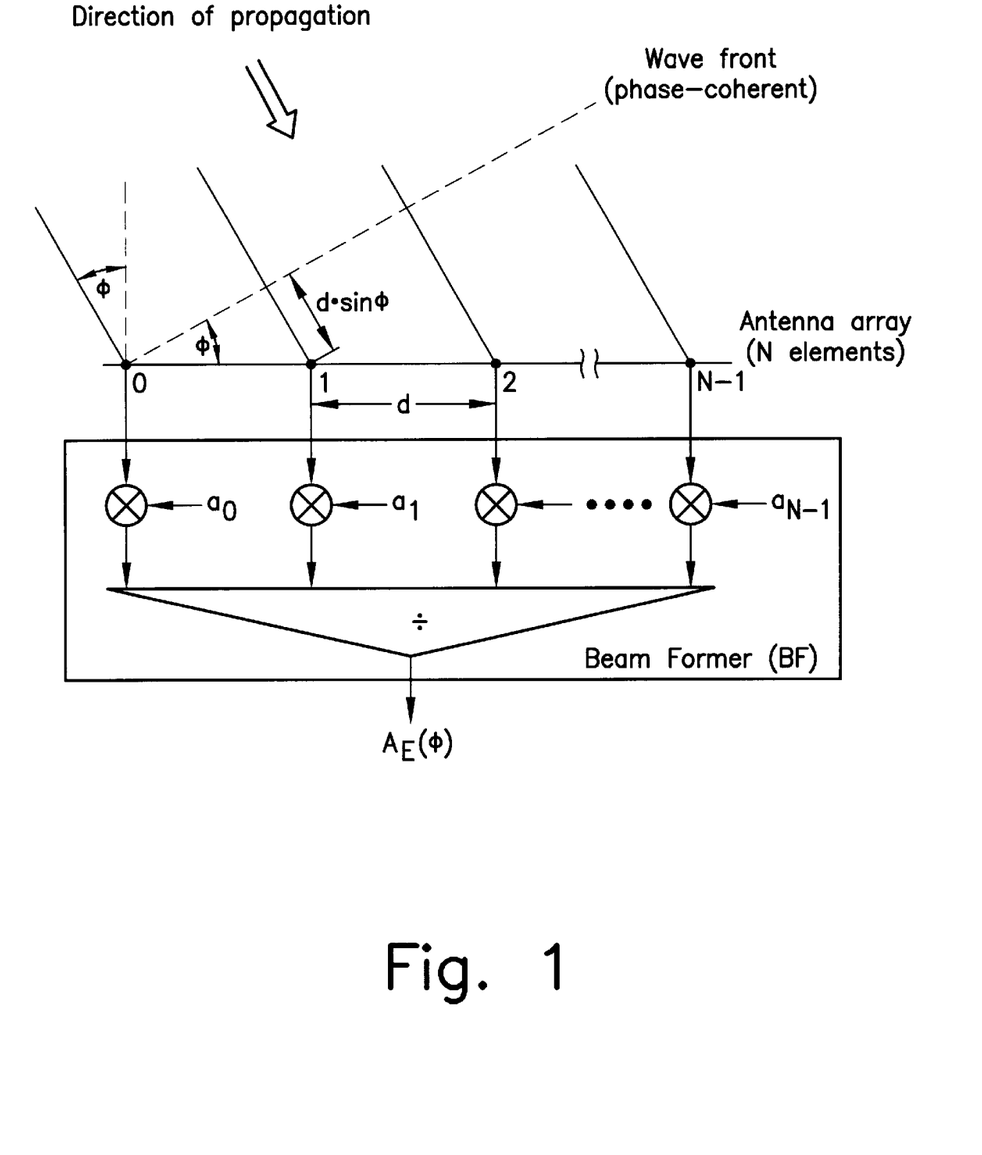
FIG. 1 shows a beam forming network with an antenna pattern for a receiver.

FIG. 1 shows a beam forming network BF (beam former), supplied with the simultaneously received signals of an antenna array having N elements. The angle at which the wave front arrives at the antenna elements is labeled with ø. The received signals are weighted, i.e., multiplied with complex coefficients $a_0, a_1, \ldots a_{N-1}$ and combined in an adder. Output signal $A_E(\emptyset)$ of the adder, which represents the antenna pattern for the receiver, is calculated as $$A_E(\phi) = \sum_{n=0}^{N-1} a_n e^{-j2\pi n \frac{d}{\lambda} \sin\phi}$$

Figure 2:
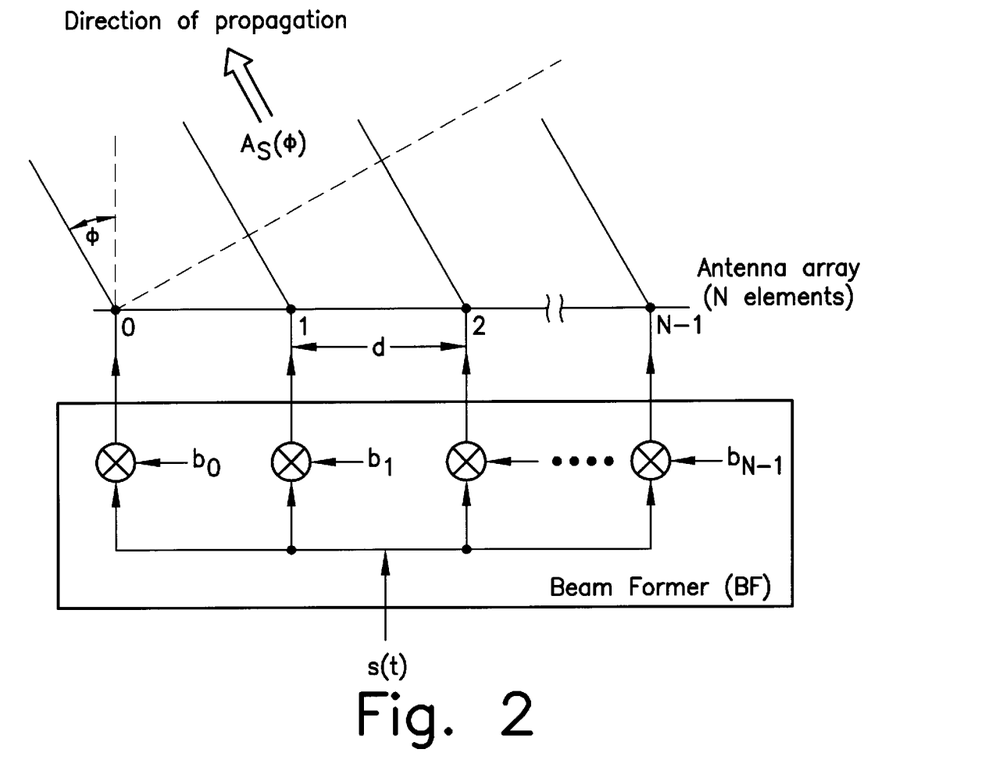
FIG. 2 shows a beam forming network with an antenna pattern for a corresponding transmitter.

FIG. 2 shows a beam forming network BF for a corresponding transmitter, which is supplied with beamed signal s(t). This signal is weighted, in particular through multiplication by complex coefficients $b_0, b_1, \ldots b_{N-1}$ in N parallel paths. The signals so weighted are used as control signals for an antenna array having 0 to N−1 antenna elements. The signals beamed by the antenna elements overlap in air. The direction-dependent complex amplitude is the antenna pattern for the transmission direction:

$$A_S(\phi) = \sum_{n=0}^{N-1} b_n e^{-j2\pi n \frac{d}{\lambda} \sin\phi}$$

For $b_n = C \cdot a_n$, $A_S(\emptyset)$ and $A_E(\emptyset)$ have identical shapes. c is a complex constant.

Figure 3:
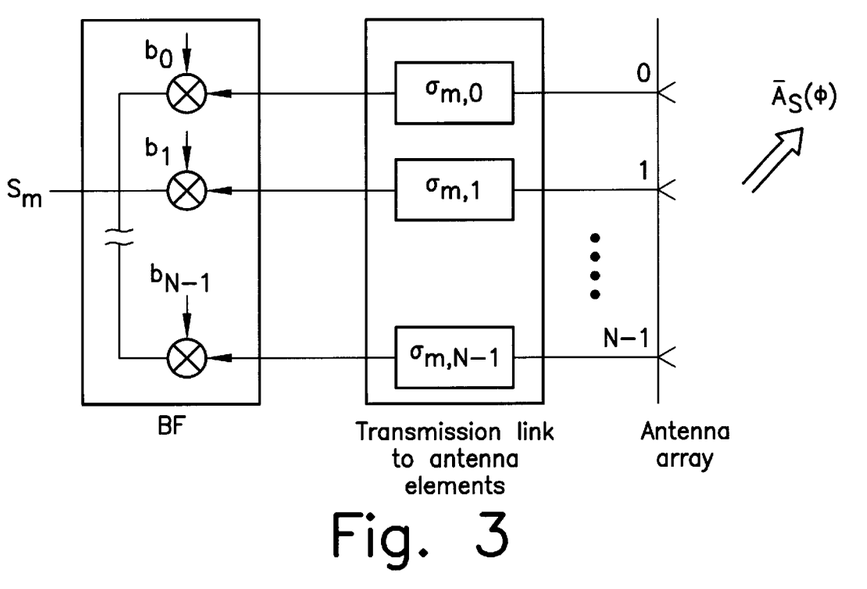
FIG. 3 shows a schematic diagram to elucidate the influencing of antenna characteristic via transmission parameters.

Since the antenna characteristic is influenced by transmission parameters, which are in general not constant over the entire frequency range, the control signals for beam forming network BF are each decomposed into frequency segments, so that the transmission function is constant in each segment. Then, for the transmission coefficients in the mth segment of the nth transmitter, $\sigma_{m,n}$=constant. FIG. 3 shows a schematic diagram to further illustrate the influencing of the antenna characteristic via transmission parameters.

As a result of the transmission link, the transmitting antenna pattern is calculated according to the following formula as a function of m:

$$\tilde{A}_S(\phi) = \sum_{n=0}^{N-1} b_n \sigma_{m,n} e^{-j2\pi n \frac{d}{\lambda} \sin\phi}$$

Factoring $\sigma_{m,n} = \sigma_m \xi_n$ is advantageous so that the antenna pattern becomes independent of m, and all the spectral components of the signal go in the same direction. This results in $$\tilde{A}_S(\phi) = \sigma_m \sum_{n=0}^{N-1} b_n \xi_n e^{-j2\pi n \frac{d}{\lambda} \sin\phi}$$

Figure 4:
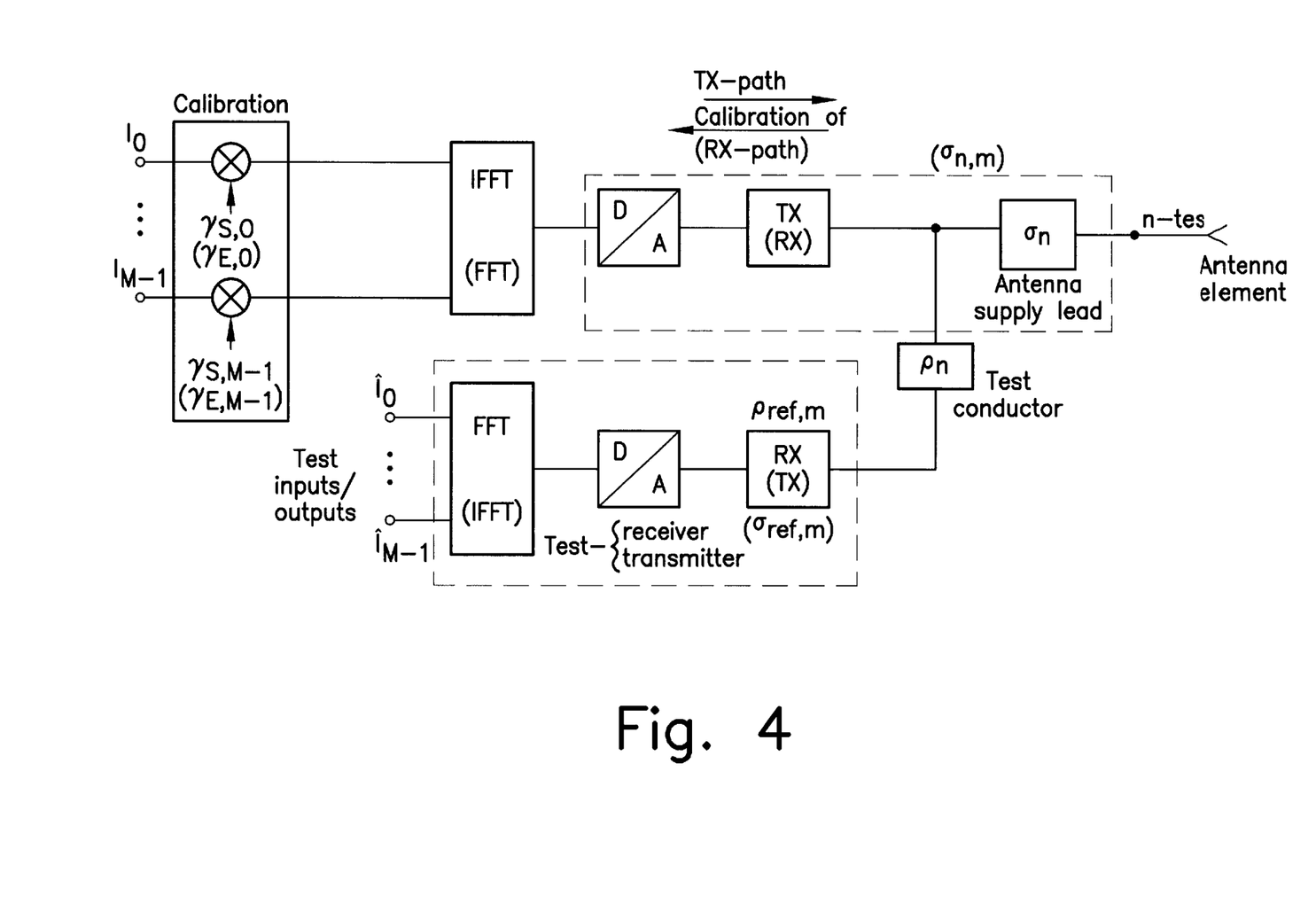
FIG. 4 shows a block diagram for the calibration of the transmitter and the receiver.

The block diagram of FIG. 4 is used for calibrating the transmitter and/or the receiver. In the receive direction, control signals $I_0$ through $I_{M-1}$, which can be delivered by a digital processor DSP, for example, are supplied to the calibration network. The calibration network contains a multiplication device, which includes as many multipliers as there are control signals, divided by frequency segments, it can receive.

After a fast Fourier transform FFT, the signals are supplied to transmitter TX via a D/A converter and to the nth antenna element via the antenna supply line with transmission coefficients $\sigma_n$. The transmission path—TX path—is characterized by transmission coefficients $\sigma_{n,m}$; the transmitted signal is picked up between the transmitter output and the antenna supply line and is supplied to reference receiver (test receiver) RX having transmission coefficients $P_{ref,m}$ via a test line having transmission coefficient $P_n$. After A/D conversion and fast Fourier transform FFT, receiver output signals $\hat{I}_0 \ldots \hat{I}_{M-1}$ appear at the test outputs. Complex coefficients $\gamma_{S,0}$ through $\gamma_{S,M-1}$ are now set so that the calibration condition $\hat{I}_m = I_m$ is met, i.e., the transmitter output signals are identical to the respective control signals after passing through the reference receiver.

Subsequently factorization is performed by calibration for the TX path. This calibration must be performed for all $n=1 \ldots N/\text{TRX}$ paths.

For measuring in the TX path, the following equation applies:

$$\hat{I}_m = I_m \cdot \gamma_{S,m} \cdot \frac{\sigma_{n,m}}{\sigma_n} \cdot \rho_n \cdot \rho_{ref,m}$$

With the adjustment condition, the following is obtained:

$$\sigma_{m,n} \cdot \gamma_{S,m} = \frac{\frac{\sigma_m}{1}}{\rho_{ref,m}} \cdot \frac{\xi_m}{\rho_n}$$

To calibrate the receive path (RX path in FIG. 4), the control signals are supplied via an inverse Fourier transform IFFT and D/A conversion into reference transmitter TX (in FIG. 4) having transmission coefficients $\sigma_{ref,m}$. At the output of the calibration network, the receiver output signal appears via the test conductor and receiver RX (in FIG. 4), AD conversion, and FFT. Also in this case, the complex calibration coefficients $\gamma_{E,0}$ through $\gamma_{E,M-1}$ are set so that the control signal and the respective test signal are of the same intensity. For the RX path the following equation applies:

$$\rho_{m,n} \cdot \gamma_{E,m} = \frac{1}{\sigma_{ref,m}} \cdot \frac{\sigma_n}{\rho_n}$$

Figure 7:
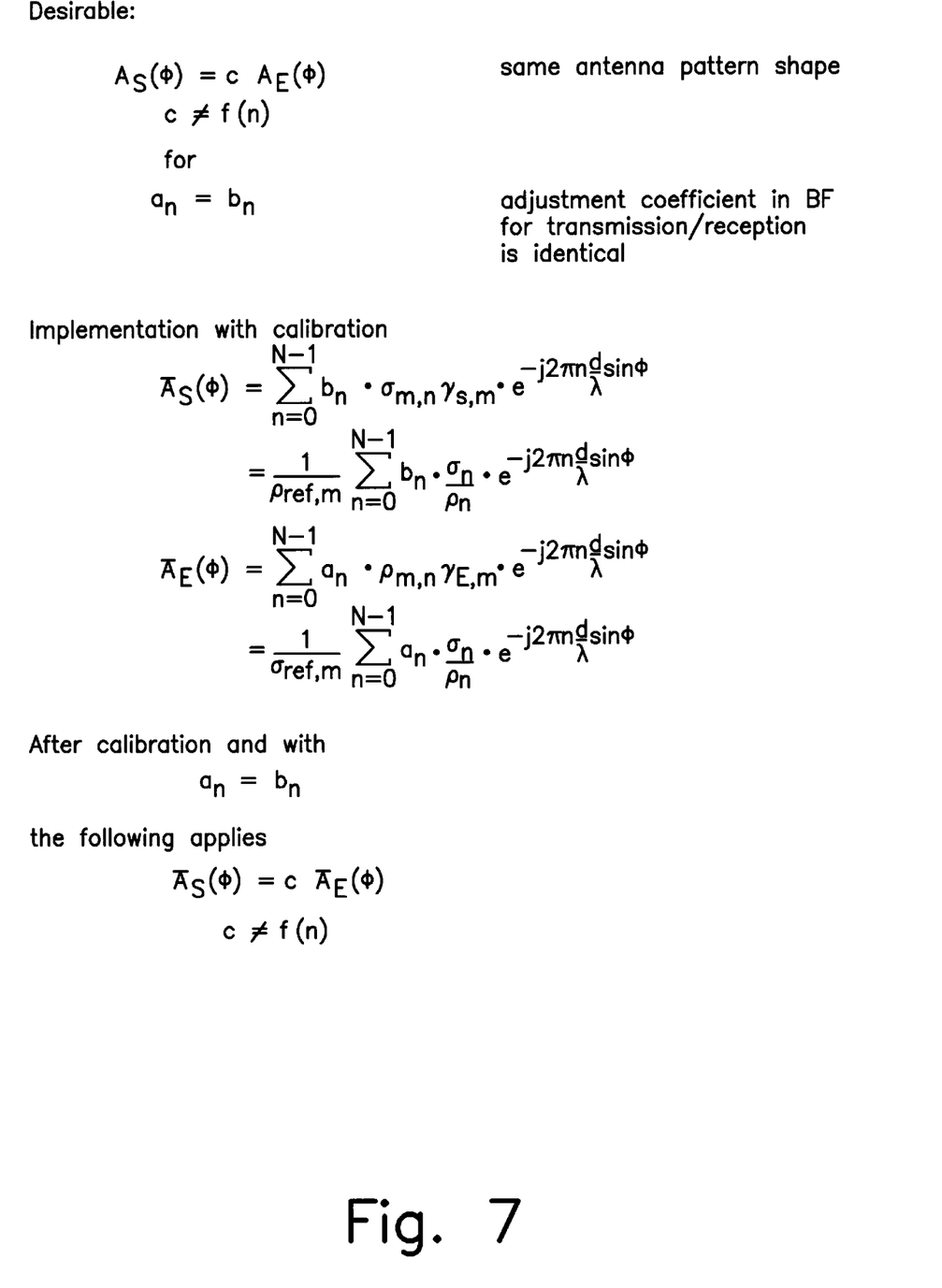
FIG. 7 shows a formulae used in the specification discussion.

BF coefficients $a_n$ and $b_n$ of the beam forming network are set according to the table: $a_n = b_n$. Thus the shape of the antenna pattern is the same for the transmit and receive directions. The relationships for the calibrated antenna patterns $\overline{A}_S(\emptyset)$ and $\overline{A}_E(\emptyset)$ are also shown in the table. They only differ by a factor c, which is independent of n.

Figure 5:
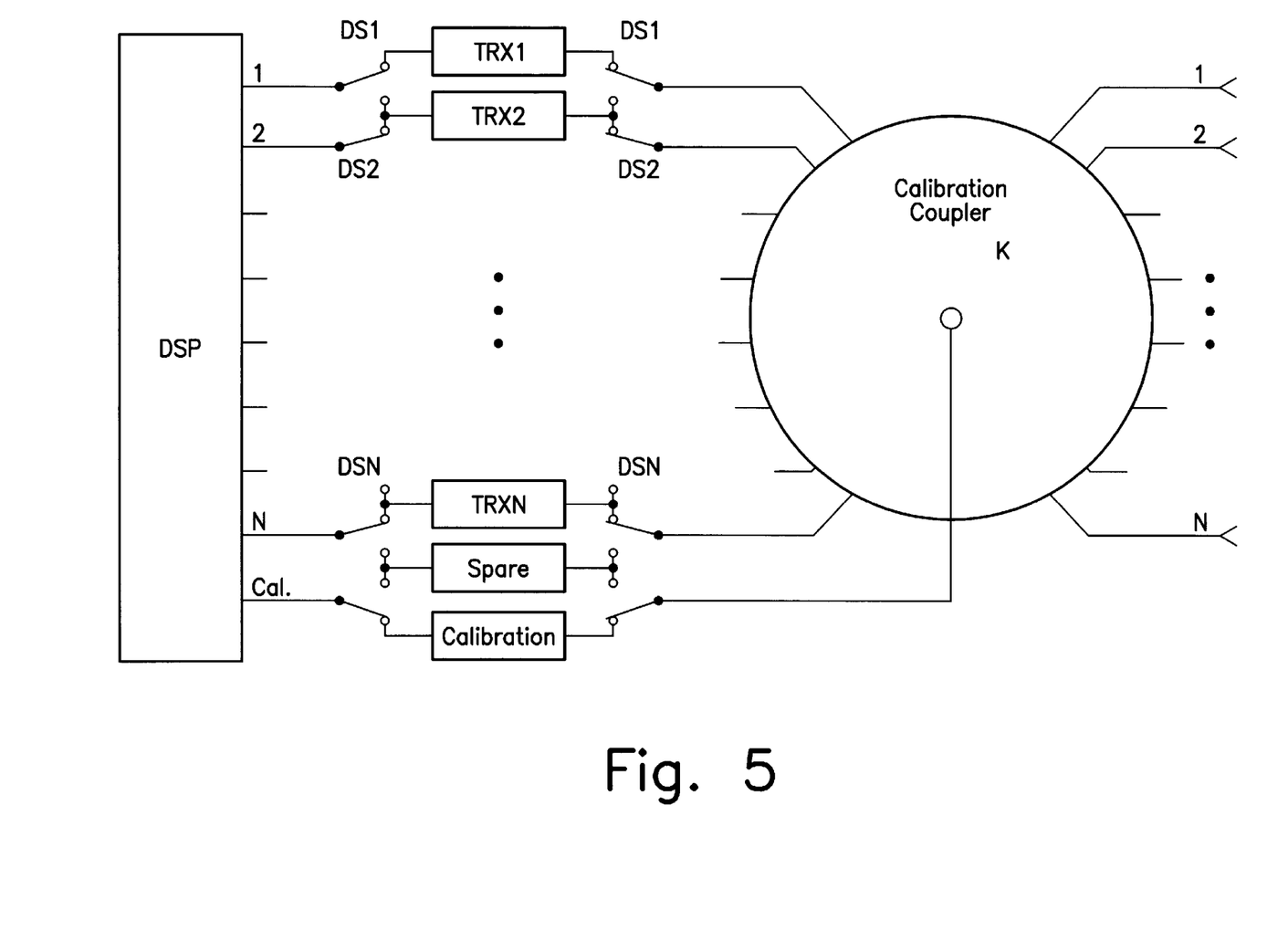
FIG. 5 shows an arrangement with a calibration coupler.

Only one reference receiver and one reference transmitter, to which the respective transmitter and receiver can be individually connected for each frequency segment, are needed for calibration. FIG. 5 shows an arrangement for calibration having a calibration coupler K. Senders/receivers TRX1 through TRX2 are connected to the calibration coupler individually via corresponding dual switches DS1 through DSN. The rotor output of calibration coupler K is connected to the reference receiver/reference transmitter for calibration. Coupler K also has the respective outputs to the antenna array. To deliver control signals—test signals—a digital signal processor DSP is provided, which also measures the output signals of the reference receiver/reference transmitter. The "spare" circuit block allows a redundancy function.

Figure 6:
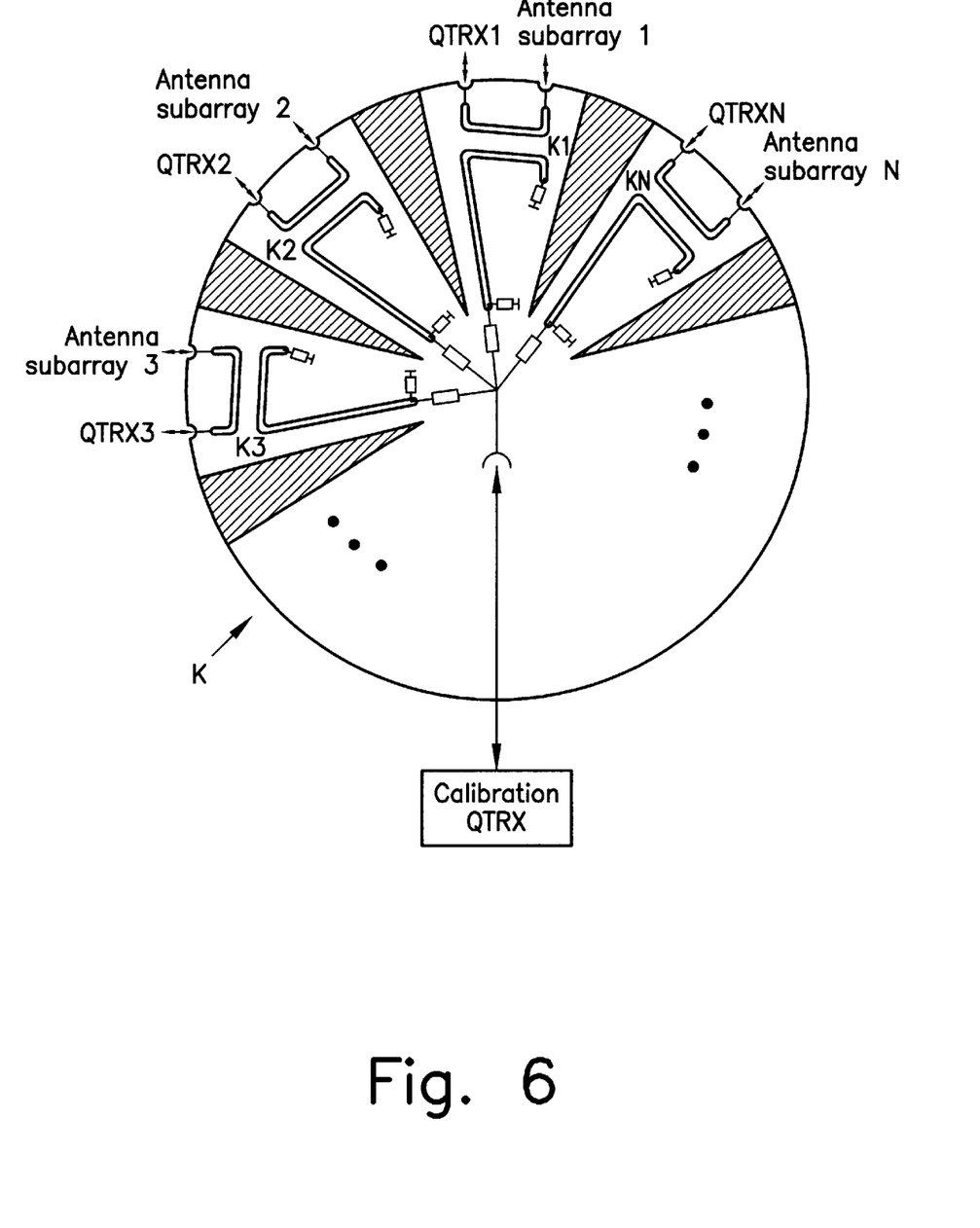
FIG. 6 shows the design of the calibration coupler.

FIG. 6 shows the internal structure of calibration coupler K. The transmitter and receiver inputs and outputs are labeled QTRX1 through QTRXN. The inputs and outputs of the N elements of the antenna array are labeled as the antenna subarray $1 \ldots N$. The input and output signals are connected to the rotor output via couplers K1 through KN, which are preferably ribbon cable couplers, and via matching resistors/terminating resistors.

After adjustment, the complex coefficients $\gamma_S$ and $\gamma_E$ can be stored in a memory chip. In operation, the calibration network is connected into the transmission or receiving train, preferably between the beam forming network and the transmitter or receiver, respectively. The calibration network can, of course, also be combined with the beam forming network into a single unit.

What is claimed is:

1. A method for calibrating at least one of a first transmitter and a first receiver for controlling a beam-forming network, comprising the steps of:

dividing each control signal of a plurality of control signals for the beam-forming network into a plurality of frequency segments;

multiplying the divided control signals for each frequency segment by a plurality of complex coefficients; and weighting the complex coefficients such that, after passing through at least one of a reference receiver and a reference transmitter, the divided control signals for each frequency segment are identical to at least one of a first plurality of output signals from the first transmitter and a second plurality of output signals from the first receiver.

2. The method according to claim 1, wherein the step of dividing includes the step of dividing each control signal into the frequency segments such that a transmission function is constant in each frequency segment.

3. An arrangement for calibrating at least one of a first transmitter and a first receiver for controlling a beam-forming network, comprising:

a generating device for generating a plurality of control signals, each control signal being divided into a plurality of frequency segments; and a calibration network including a multiplication device, the calibration network being coupled to the generating device, the multiplication device being coupled into at least one of a transmission link and a reception link between the beam forming network and an antenna array, the calibration network having a plurality of inputs and a plurality of outputs corresponding to respective control signals, the calibration network being adjusted so that the divided control signals for each frequency segment are at least one of: identical to a first plurality of output signals from the first transmitter after the divided control signals for each frequency segment have been passed through a reference receiver; and identical to a second plurality of output signals from the first receiver after the divided control signals for each frequency segment have been passed through a reference transmitter.

4. The arrangement of claim 3, wherein the multiplication device includes a plurality of multipliers, the multipliers being supplied with adjustable complex coefficients, the complex coefficients being adjusted such that the divided control signals for each frequency segment are at least one of: identical to the first plurality of output signals from the first transmitter after the divided control signals for each frequency segment have been passed through the reference receiver; and identical to the second plurality of output signals from the first receiver after the divided control signals for each frequency segment have been passed through the reference transmitter.

5. The arrangement of claim 3, wherein the reference receiver includes only one reference receiver provided for a calibration to which the corresponding first transmitter is connected individually for each frequency segment.

6. The arrangement of claim 5, wherein the first transmitter is coupled to the reference receiver and to the antenna array via a calibration coupler, and wherein the first receiver is coupled to the reference transmitter and to the antenna array via the calibration coupler.

7. The arrangement of claim 3, wherein the reference transmitter includes only one reference transmitter provided for a calibration to which the corresponding first receiver is connected individually for each frequency segment.

8. The arrangement of claim 7, wherein the first transmitter is coupled to the reference receiver and to the antenna array via a calibration coupler, and wherein the first receiver is coupled to the reference transmitter and to the antenna array via the calibration coupler.

\* \* \* \* \*

UNITED STATES PATENT AND TRADEMARK OFFICE
CERTIFICATE OF CORRECTION

PATENT NO. : 6,255,986 B1 Page 1 of 1
DATED : July 3, 2001
INVENTOR(S) : Alberty, Thomas et al.

It is certified that error appears in the above-identified patent and that said Letters Patent is hereby corrected as shown below:

<u>Title page, Item [54] and Column 1, line 1,</u>
Title, change the title to read -- CALIBRATION METHOD AND CALIBRATION DEVICE --

Item [57], ABSTRACT,
Line 9, after the word "characteristic" add -- to be set for transmitter and receiver without high-precision transmitters on receivers being required. --

<u>Column 1,</u>
Lines 56 and 57, delete and add -- Fig. 7 shows the relationship between antenna patterns $A_s(\varphi)$ and $A_E(\varphi)$, as well as the relationship between calibrated antenna patterns $\bar{A}_s(\varphi)$ and $\bar{A}_E(\varphi)$. --

<u>Column 3,</u>
Line 8, change "Subsequently" to -- Subsequently, --
Line 40, change "...table:" to -- ... table, which is shown in Fig. 7: --

Signed and Sealed this

Seventeenth Day of December, 2002

JAMES E. ROGAN
*Director of the United States Patent and Trademark Office*